Dec. 2, 1930.  G. LOWENSTEIN  1,783,296
MEANS FOR HANDLING AND STORING MOTOR VEHICLES
Filed Oct. 17, 1927  2 Sheets-Sheet 1

Inventor
Gothard Lowenstein
By his Attorney

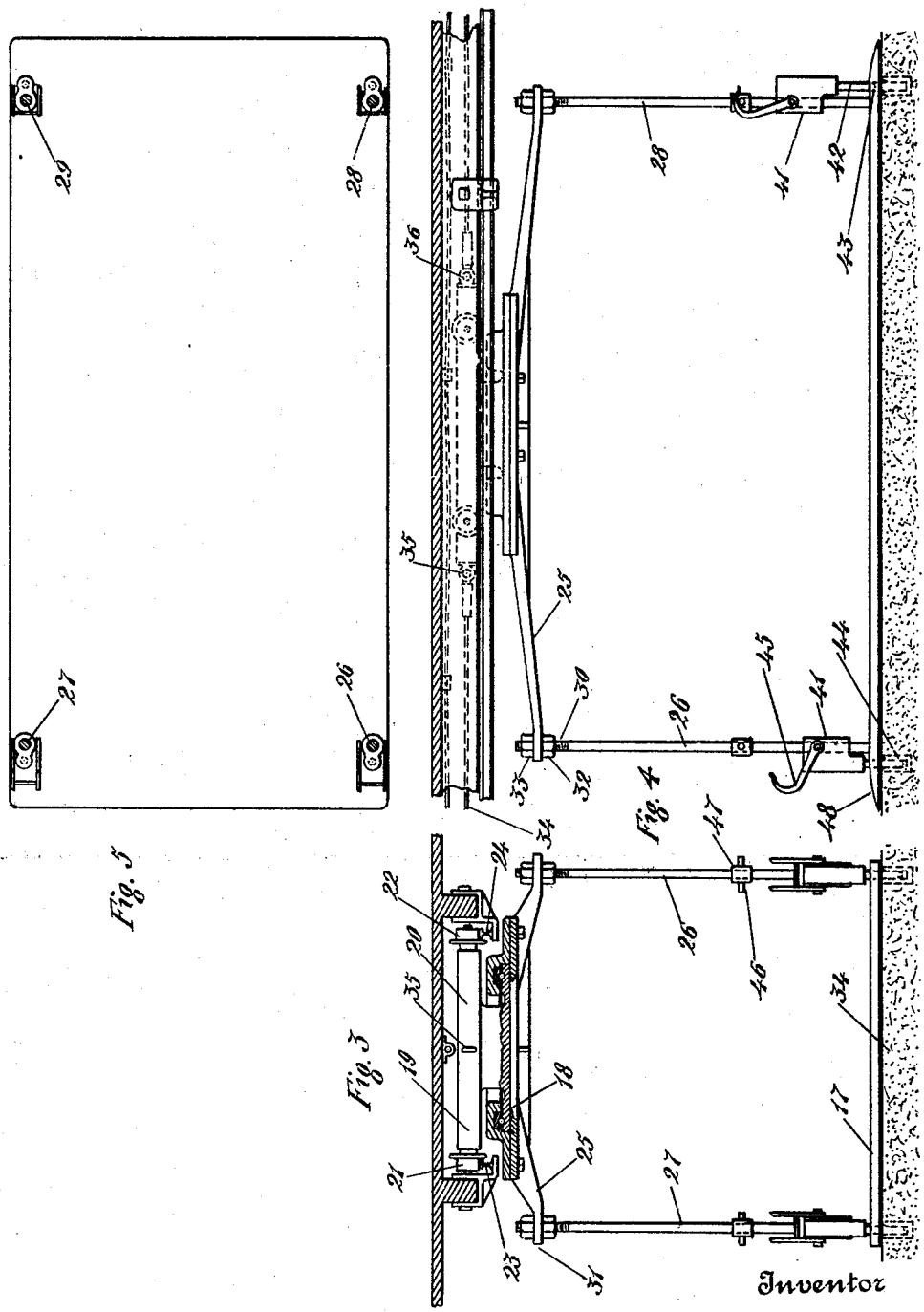

Patented Dec. 2, 1930

1,783,296

UNITED STATES PATENT OFFICE

GOTHARD LOWENSTEIN, OF BROOKLYN, NEW YORK

MEANS FOR HANDLING AND STORING MOTOR VEHICLES

Application filed October 17, 1927. Serial No. 226,757.

This invention relates to means for storing and handling automobiles or other vehicles and more particularly refers to a novel and improved arrangement whereby vehicles may be readily and conveniently set in their proper position on a garage floor, or removed therefrom without disturbing or interfering with other vehicles placed in their respective storage spaces.

The primary object of this invention is to provide a novel and improved arrangement of suspended rotatable platform adapted to hold motor cars and like vehicles, making it possible to quickly turn around said vehicles within a restricted space in order to facilitate the distribution or removal of said vehicles from a garage floor.

Another object is to provide a novel and improved arrangement of traveling rotatable suspended platform, making it possible to rapidly handle, deliver and remove cars to and from their respective storage places on a garage floor, insuring safe movements of said cars, within a relatively restricted space.

A further object of the invention is to provide a novel and improved arrangement of means for handling and storing vehicles in a garage, whereby a maximum number of vehicles may be stored within a given space, and whereby said vehicles may be readily placed in their respective stalls or storage spaces and may just as readily be removed therefrom without interfering with the other vehicles on the floor.

A still further object is to provide means of a novel and relatively simple construction for handling vehicles to be stored on or removed from a garage floor, the nature of said means being such that the same can be easily installed in existing garages without requiring the necessity of material alterations to the floors or other parts of the building.

Other objects and advantages of the present invention will more fully appear as the description proceeds and will be set forth and claimed in the appended claims.

The steering of motor cars within garages of the ordinary type, which is required when the cars have to reach or to leave their respective places of storage, makes it necessary to provide a considerable amount of open space on the garage floor, curtailing the storage capacity of said floor.

The various movements required of a motor car under usual conditions, are a frequent source of accidents and damage to motor cars stored on the premises, because such movements are usually difficult to perform even for an experienced driver.

A direct further consequence of these conditions, is also that considerable time is usually required for placing a car in its allotted space, and for removing it therefrom, so that garage operations as a whole suffer considerable delay, reflecting upon the service available for the users.

Due to these and other considerations of the same character, it is therefore highly desirable that means be provided for the rapid handling of incoming and outgoing cars; and it is equally desirable that the means thus provided be of such a nature as to permit the maximum utilization of the available floor space.

These results are obtained by my present invention, the novel features of which are illustrated in the accompanying drawings, in which:

Fig. 3 is a detail front view in elevation partly sectioned of the traveling rotatable platform shown in Fig. 2;

Fig. 4 is a side view in elevation of the same; and

Fig. 5 is a plan sectional view through line 5—5 of Fig. 4.

Figure 1:
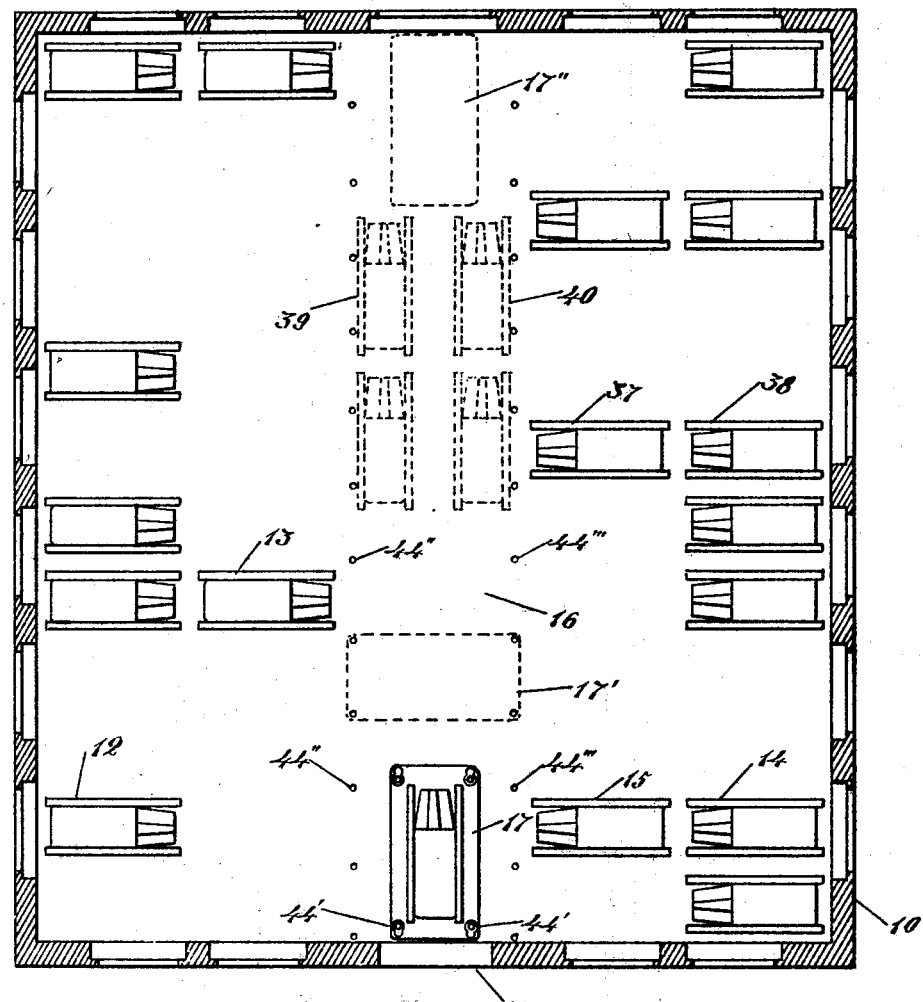
Fig. 1 is a plan view of a garage floor equipped with the means for handling vehicles forming one of the objects of the present invention.
Figure 2:
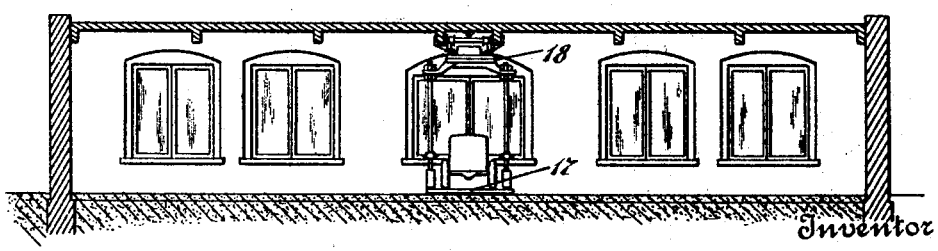
Fig. 2 is a cross sectional view in elevation of the garage.

The drawings represent a single story garage 10 provided with a front door 11 and wide enough to accommodate two longitudinal rows of cars 12—13, 14—15, at each side, leaving a central runway 16. The cars are arranged transversely of the runway so that each transversal stall or storage space accommodates two cars, one in front of the other.

It follows that the cars are turned at right angle to the direction in which they enter or leave the garage. In order to facilitate the turning movement of the cars and their translatory movement to a position on the central runway opposite their storage space, I provide a suspended platform 17, which is held very close to the floor and which is of a size suitable to receive a motor car.

Said platfrom may be turned at any angle about a pivotal suspension plate 18 depending from a carriage 19. Said carriage comprises a frame 20 and side wheels 21, 22 running on rails 23, 24, constituting overhead tracks for the structure.

The platform 17 is suspended from an upper member or frame 25 by means of four uprights, 26, 27, 28, 29. Said uprights are preferably threaded at the upper end as shown at 30 and are secured in position onto lugs 31 of frame 25 by means of nuts 32, 33.

By virtue of this arrangement, the distance of platform 17 from frame 25 can be carefully adjusted so that while the platform is held quite close to the floor 34 underneath, it does not actually abut against said floor, so that it is possible to freely move the platform along the floor and to rotate the cage formed by platform 17, frame 25 and uprights 26, 27, 28, 29 about its pivotal suspension.

Tracks 23, 24, extend from a point at the front opposite the garage door to the rear of the building, above the center of runway 16.

When a car enters a garage, the platform is disposed longitudinally of runway 16 as shown in Fig. 1, and the car can be driven on its own power directly on top of the platform. The structure comprising carriage 19 and the cage depending therefrom is then caused to travel along the tracks until the place opposite the stall in which the car is to be stored is reached.

At this point, the travel of the carriage is stopped and the cage is rotated 90 degrees by hand to the right or to the left about its pivotal point of suspension, thus causing the car to turn with the platform on which it is supported to the tranversal direction necessary from the car to reach its storage space on its own power.

The tranversal position assumed by the platform at such times, is shown in dotted lines at 17', in Fig. 1. The travel of the cage along the tracks may be effected by hand, or else it may be effected by any suitable driving mechansim such as for instance, a continuous cable, as shown at 34, attached at 35, 36 to the front and rear ends of the carriage. The movement of the cable may be produced in any desired manner by employing suitable driving gear which need not here be described.

It is obvious that by virtue of this arrangement it is possible to quickly handle cars to and from their storage space on the garage floor, the required turning movements being always effected by means of the mechanism described, while the cars thus handled will only have to be driven in a straight direction to and from platform 17.

This arrangement leaves the floor entirely free of any obstruction and does not call for any depression or other alteration of the floor, so that the garage space may be used in the ordinary manner, if for any reason the handling mechanism should be out of commission.

Although it is obvious that the arrangement of traveling suspended platform described may be made to serve one single row of storage cars one each side, the drawings illustrate an application where each storage space alongside the runway can accommodate two rows of cars, one in front of the other. Thus referring to Fig. 1 it is seen that car 37 is stored directly in front of car 38, so that in order to withdraw car 38 it is necessary first to move car 39 to some other empty space, clearing the space in front of car 38.

Car 38 can then be driven upon platform 17 and can then be turned 90 degrees by said platform so as to be directly in line with the exit.

While some extra maneuvering is thus required in order to store or withdraw cars in the rows nearest to the side walls, when other cars are stored in front of their storage spaces, considerably more space is utilized than if the traveling platform is provided for single rows of cars only; furthermore, the cost of installation is proportionately lower. Therefore, when an arrangement such as shown in the drawings is adopted, it is sufficient to leave one or two free spaces in the inner rows, where cars from other spaces may be moved in order to clear the space in front of other cars stored in the outer rows.

The arrangement furthermore permits utilization of the entire garage floor, since when the side rows are all filled, it is possible in an emergency to also store cars arranged in two adjoining longitudinal rows within the runway, as shown in dotted lines at 39, 40; a car may also be stored, if desired, on top of the platform which may be moved to the rear end of the floor as shown in dotted lines at 17''.

In practice, a solidly built structure suspended from a carriage having ample bearing surface will usually stay wherever it is put especially if braking means of any suitable type are provided, so that a car may be driven on or off the platform without any difficulty. However in order to avoid any undue strain upon the structure and in order to insure positive action at all times, means may be provided to prevent displacement of the platform due to the action of a car being driven on or off said platform.

For instance, a simple means is illustrated in the drawings where it is seen that the platform's uprights are each provided with a sliding plunger 41, provided with a downwardly extending pin 42 embedded in the floor of the garage.

Each slide is provided with a hook shaped retaining member 45 adapted to engage pins 46 laterally projecting from bushings 47 fixed onto said uprights.

When the slides are held in their upward or inoperative position as shown at the right of Fig. 4, pins 42 project through the upper surface of platform 17 but do not reach the lower surface of said platform so that they do not offer any hindrance to the translatory and rotatory movements of said platform.

When the platform is brought to any one of its car receiving or delivering positions, two of the slides at one end of said platform may be released, causing their pins to drop within the sockets 44 underneath, which are placed to suit the operative positions of the platform.

For instance, two sockets may be provided close to the entrance as shown at 44', and two rows of sockets shown at 44'', 44''', may be placed at each side of the runway in positions corresponding to the transversal operative positions of the platform as shown at 17'.

By virtue of this simple arrangement, the platform is absolutely prevented from being displaced by the impact of a car being driven on or off the platform and angular displacements of the platform about its pivotal suspension are likewise prevented.

The two ends of the platform are preferably made slanted as shown at 48 in order to facilitate the movement of the cars to and from said platform.

It is obvious that the traveling carriage and the cage or car suspended therefrom, may be constructed in ways different from that shown. The pivotal connection between said two elements can also be of a different design, without departing from the inventive idea.

The drawings will therefore be understood as being intended for illustrative purposes only and not in a limiting sense. Although the arrangement described is especially suitable for garage service, similar arrangements can also be used for other purposes such as the storage and handling of merchandise of various descriptions, etc.

I therefore reserve myself the right to carry my invention into practice in all those ways and manners which may enter fairly into the scope of the appended claims.

I claim:

1. In a building for the purpose described, the combination with a floor, of a carrier comprising an overhead traveling carriage, and a platform suspended at a set distance therefrom, said platform extending substantially down and being substantially parallel to the level of said floor, allowing a small clearance underneath said platform just sufficient to permit free displacement of said platform along said floor.

2. In a building for the purpose described, the combination with a floor, of a carrier comprising an overhead traveling carriage, and a platform suspended at a set distance therefrom, said platform being adapted to extend substantially down and being substantially parallel to the level of said floor, and means for adjusting the distance of said platform from said carriage, so as to permanently allow a clearance underneath said platform just sufficient to permit free displacement of said platform along said floor.

3. In a building for the purpose described, the combination with a floor, of a carrier comprising an overhead traveling carriage, a platform suspended at a set distance therefrom, extending substantially down and being substantially parallel to the level of said floor, allowing a small clearance underneath said platform, just sufficient to permit free displacement of said platform along said floor, and a vertical pivotal connection between said carriage and platform.

4. In a building for the purpose described, the combination with a floor, of a carrier comprising an overhead traveling carriage, a platform suspended at a set distance therefrom, adapted to extend substantially down and being substantially parallel to the level of said floor, means for adjusting the distance of said platform from said carriage, so as to permanently allow a clearance underneath said platform just sufficient to permit free displacement of said platform along said floor, and a vertical pivotal connection between said carriage and said platform.

5. In a building for the purpose described, the combination with a floor, of a carrier comprising an overhead traveling carriage, and a platform suspended at a set distance therefrom, said platform extending substantially down to the level of said floor, allowing a small clearance underneath said platform along said floor, openings in said floor located at certain predetermined positions, and movable means associated with said platform, adapted to engage said openings in order to retain said carrier against displacement along said floor.

6. In a building for the purpose described, the combination with a floor, of a carrier comprising an overhead traveling carriage, a platform suspended at a set distance therefrom, adapted to extend substantially down and being substantially parallel to the level of said floor, means for adjusting the distance of said platform from said carriage, so as to permanently allow a clearance underneath said platform just sufficient to permit free displacement of said platform along said floor, a vertical pivotal connection between said carriage and said platform, openings in said floor, located at certain predetermined positions, and movable means associated with said platform, adapted to engage said openings in order to retain said carrier against displacement along said floor.

7. In a building for the purpose described, the combination with a floor, of an overhead trackway, a carrier comprising a carriage movable along said trackway, and a platform suspended at a set distance from said carriage, said platform extending substantially down and being substantially parallel to the level of said floor, allowing a small clearance underneath said platform just sufficient to permit free displacement of said platform along said floor.

8. In a building for the purpose described, the combination with a floor, of an overhead trackway, a carrier comprising a carriage movable along said trackway, and a platform suspended at a set distance from said carriage, said platform being adapted to extend substantially down and being substantially parallel to the level of said floor, and means for adjusting the distance of said platform from said carriage, so as to permanently allow a clearance underneath said platform, sufficient to permit free displacement of said platform along said floor.

9. In a building for the purpose described, the combination with a floor, of an overhead trackway, a carrier comprising a carriage movable along said trackway, and a platform suspended at a set distance from said carriage, said platform extending substantially down and being substantially parallel to the level of said floor, allowing a small clearance underneath said platform just sufficient to permit free displacement of said platform along said floor, and a vertical pivotal connection between said carriage and platform.

10. In a building for the purpose described, the combination with a floor, of an overhead trackway, a carrier comprising a carriage movable along said trackway, and a platform suspended at a set distance from said carriage, said platform extending substantially down and being substantially parallel to the level of said floor, allowing a small clearance underneath said platform just sufficient to permit free displacement of said platform along said floor, a vertical pivotal connection between said carriage and platform, openings in said floor located at certain predetermined positions, and movable means associated with said platform, adapted to engage said openings in order to retain said carrier against displacement along said floor.

11. In a building for the purpose described, the combination with a floor, and an overhead trackway, of a carriage movable along said trackway, a carrier frame member suspended from said carriage, a vertical pivotal connection between said carriage and frame member, uprights depending from said frame member, a platfrom suspended from said uprights, said platform being held substantially down to the level of said floor, allowing a small clearance underneath said platform, sufficient to permit free displacement of said platform along said floor, openings in said floor, located at certain predetermined positions, and bolt members slidable on said uprights adapted for insertion through said openings, retaining said platform against displacement along said floor.

12. In a building for the purpose described, the combination with a floor, and an overhead trackway, of a carriage movable along said trackway, a carrier frame member suspended from said carriage, a vertical pivotal connection between said carriage and frame member, axially adjustable uprights depending from said member, a platform suspended from said uprights, said platform being held substantially down to the level of said floor, allowing a small clearance underneath said platform, sufficient to permit free displacement of said platform along said floor, openings in said floor, located at certain predetermined positions, bolt members slidable on said uprights adapted for insertion through said openings, retaining said platform against displacement along said floor, and means for retaining said bolt members in their inoperative position.

GOTHARD LOWENSTEIN.